March 6, 1934.   R. D. MERSHON   1,949,870
ELECTRODE OR TERMINAL FOR ELECTROLYTIC APPARATUS
Original Filed Dec. 14, 1928
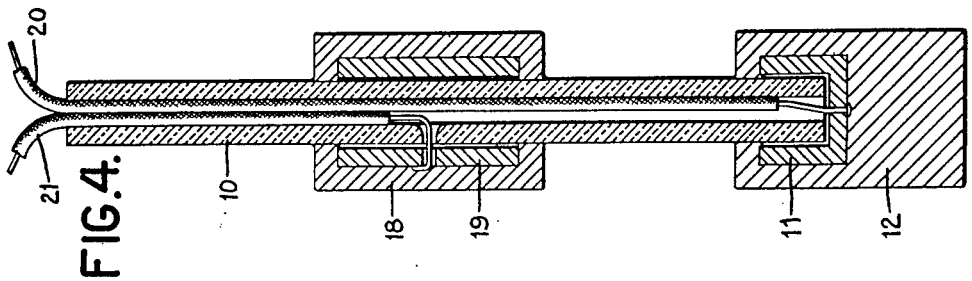
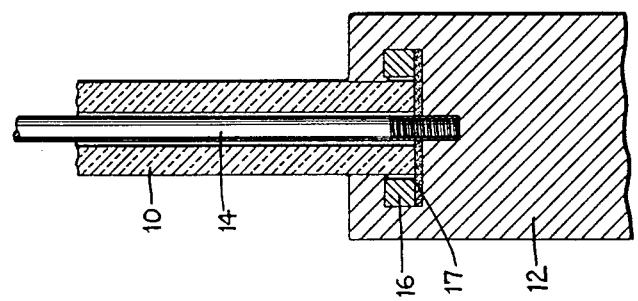
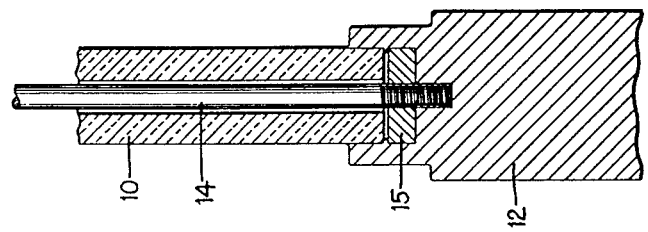
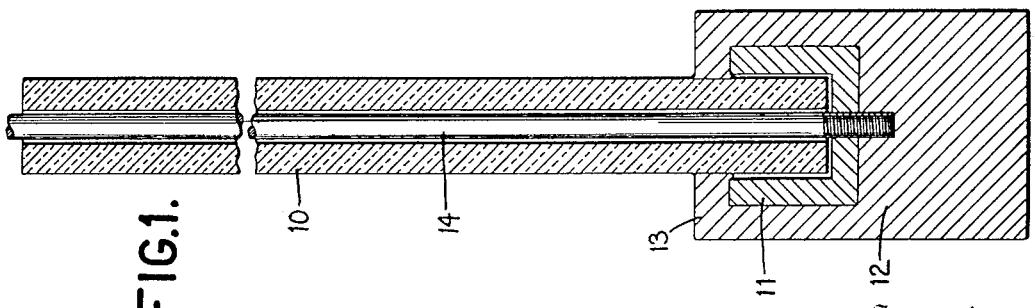
Inventor
R. D. Mershon
By his Attorneys
Cooper, Kerr & Dunham Patented Mar. 6, 1934

1,949,870

UNITED STATES PATENT OFFICE 1,949,870

ELECTRODE OR TERMINAL FOR ELECTROLYTIC APPARATUS

Ralph D. Mershon, New York, N. Y.

Application December 14, 1928, Serial No. 326,034
Renewed June 3, 1933

9 Claims. (Cl. 175—315)

In the operation of electrolytic rectifiers, condensers and the like, consisting essentially of one or more filmed electrodes of aluminum or other suitable metal immersed in an electrolyte, the filmed parts upon which current is impressed are subject to corrosion at the points where they extend out of the electrolyte, at or near the surface of the latter, with such injury to the part that sooner or later it must be replaced. One method of lessening the trouble and expense thus occasioned is to submerge the electrodes entirely and connect them to the external circuit by means of filmed leads so that corrosion at the surface of the electrolyte will be confined to the leads, which are cheap and easily replaced. Going still farther it has been found that corrosion of the leads themselves can be entirely prevented by a construction in which the leads may project out of the electrolyte and yet not be in contact therewith at its surface. This construction is described and claimed broadly in my prior Patent No. 1,572,404, issued February 9, 1926, which illustrates, as one embodiment of the invention, a terminal in which the lead extends from the electrolyte into the submerged end of an insulating tube of glass or porcelain, which submerged end is itself closed by a closure of filming metal in hermetic contact with the tube. Preferably the closure is in the form of a cap, cast in place. That method insures a perfect hermetic seal, but the shrinkage of the cap in cooling subjects the tube to undesirable compression stresses which may and sometimes do crack the tube, especially when the cap is at all massive.

My present invention is designed to obviate the liability of breakage of the insulating tube, and its chief object is to provide a device of the class indicated, in which the compression stresses incident to contraction of the cap are diminished to a value which the tube can readily withstand even when the contracting member is large and thick. This has the additional and highly important advantage that the cast or shrunk member may thus be made large enough to serve as an electrode itself, say in a condenser, rectifier or "valve". To this and other ends the invention comprises the novel features hereinafter described.

In carrying out the invention in the preferred manner the insulating tube is provided with a cap or band of metal (preferably invar steel) which has a lower coefficient of expansion than the metal which is to be shrunk on the tube, and the sealing cap or ring is then cast or shrunk over the other. Compression incident to contraction of the sealing member is then largely taken up by the other member. In fact, by suitably proportioning the dimensions of the two members, the compression exerted upon the tube can be reduced to any desired degree. It can be made zero; or even negative, if a bond is formed at the contact of the sealing member and the tube.

Referring to the accompanying drawing,

Fig. 1 is a longitudinal section illustrating one form of the invention.

Figs. 2 and 3 are longitudinal sectional views illustrating other embodiments.

Fig. 4 is a longitudinal sectional view illustrating an embodiment in which two filming members are mounted on the same insulating tube, providing a complete condenser or rectifier unit.

Referring to Fig. 1, the insulating tube, of porcelain or glass, is shown at 10. On the lower end of the tube, spaced slightly therefrom, is a cap 11, of invar steel or other suitable metal having a lower coefficient of expansion and contraction than the filming metal of the electrode. Cast around the cap 11 is a body 12 of the filming metal, preferably aluminum, with a flange 13 extending over the top of the cap into hermetic contact with the tube, which, if made of porcelain, should be glazed. The lead 14, electrically connected to the body 12, extends out through the tube.

The body 12 may be cast in place in any convenient manner, the tube 10 and cap 11 being positioned in a suitable mold, not shown. By attaching the lead to the cap 11, for example by threading the lead into the bottom of the cap, as indicated, the lead may be used as a convenient support for the cap to position the latter accurately in the casting operation.

Spacing the cap from the tube is desirable, to insure that the cap itself will not, in cooling, exert any compression on the tube, but the molten metal should not be permitted to run far into the space. The viscosity and surface tension of the molten aluminum or aluminum alloy used are sufficient to prevent this if the space is not too great; or the space may be filled, around the top, with friable refractory material, such as graphite, which will keep out the hot fluid metal but will crush before contraction of the cap 11 exerts enough compression to crack the tube. It is desirable, also, that there be space between the bottom of the inside of the cap and the end of the tube in order to obviate the shearing stress which might otherwise be thrown upon the hermetic seal formed between the sealing metal and the tube. This may be conveniently provided for by making use of the lead to position the cap during casting. If the positioning be accomplished by means of a slight friction between the lead and the tube, such as, for instance, could be produced by wrapping some asbestos paper around a short length of the lead, the cap will be capable of moving if any axial stress comes upon it.

As the cast metal contracts, the cap 11, contracting less, diminishes the compression that would otherwise be exerted on the tube by the flange 13, which may, if necessary, be proportionately much thinner than indicated in Fig. 1, so long as the contacting surfaces of the tube and casting are of sufficient extent to insure an hermetic seal. Ordinarily such a joint is not difficult to obtain, as the molten metal appears to combine with or weld itself to the vitreous surface of the tube, i. e., to the glaze of a porcelain tube or to the glass of a glass tube.

The casting 12 may be connected to the electrode, not shown, in any convenient manner, or if large enough, as in the figure, it may itself serve as an electrode. The latter feature is of special value in an electrolytic rectifier or valve, since in such devices the electrode is gradually consumed and the more metal there is in the electrode the longer it will last.

I prefer to have the lead 14, which may be of suitable filming or non-filming metal, extend through the cap 11 into the casting 12, as this provides direct metallic contact between the two, but this is not always necessary as in most cases the contact between the cap and the cast body will be found entirely sufficient.

In the construction shown in Fig. 2 the function of the cap 11 of Fig. 1, in protecting the tube from excessive compression stress, is performed by a disk 15 of invar steel or other suitable metal, the vertical thickness of the disk and the radial thickness of the casting above the disk being proportioned as may be necessary to prevent excessive compression of the end of the tube.

In Fig. 3 the tube is protected by a ring 16 around its end. In casting the body 12 the end of the tube is closed by a thin disk 17, of graphite or other friable refractory material, which may extend under the ring 16 to support the same in the mold.

Instead of casting the body of filming metal on the end of the tube it may be cast in the form of a collar in any position on the tube, thus making it possible to have two or more filming bodies on the same tube, as in Fig. 4, for example, in which the tube carries a filming body 12 at its lower end and a filming body 18 in the form of a collar cast over a protecting ring 19. By connecting the two filming bodies to separate leads, as 20, 21, the device may be used in a suitable electrolyte to form a condenser or a full-wave rectifier.

In some cases a tight enough seal between the tube and the filming body may be obtained by shrinking the latter in place. In such type of construction the opening or openings in the filming body, pre-formed with the compression resisting member inside, are made too small to admit the tube when cold, but large enough to do so when heated. As the body cools, its contraction will bring it into close firm contact with the surface of the tube, while the inner member protects the tube from excessive compression stresses.

I have described the protecting or compression resisting member as being made of metal, but in some cases it may be made of other material. For example, the disk 15, in Fig. 2, may be of the same material as the tube, especially if of somewhat larger diameter than the tube, its greater radial thickness giving it correspondingly greater strength. Even if broken by the contracting metal it will usually afford sufficient protection to prevent breakage of the tube.

In general, if the coefficient of expansion of the material of the protecting member is greater than that of the tube, the difference between the two should preferably be as small as possible. In any case the clearance between two parts, where clearance is necessary, as it usually is, should be as small as possible without permitting breakage of the tube by expansion of the latter against the protecting member or by contraction of the protecting member upon the tube. Knowing the coefficients of expansion of the three parts—the tube, the protecting member, and the filming metal body—the required clearance can be calculated with all necessary accuracy, or it can be determined by a few trials.

The invention is especially useful in electrolytic apparatus and I have described certain embodiments designed for use in such apparatus, but it can also be used to advantage in other apparatus, as for example where a lead or other member is to be protected from contact with a fluid. In such other uses it may not be necessary to employ filming metal or if such metal be employed it may not be necessary for it to have a film.

It is to be understood that the invention is not limited to the forms and methods herein specifically described but can be carried out in other ways without departure from its spirit as defined by the following claims.

I claim—

1. In an electrolytic apparatus, a device comprising an insulating tube, a filming member encircling the tube and gripping the same with hermetic contact, means inside the filming member adapted to prevent breakage of the tube by the compression of the filming member, and a lead in the tube, in electrical connection with the filming member.

2. In an electrolytic apparatus, a device comprising an insulating tube, a member of filming metal encircling the tube in compressive engagement therewith, a member of lower coefficient of expansion than the filming member, arranged inside of the latter to protect the tube against excessive compression by the filming member, and a lead in the tube, in electrical connection with the filming member.

3. In an electrolytic apparatus, a device comprising an insulating tube, a member of filming metal encircling the tube and hermetically sealed thereto by compressive contact, a metal member of lower coefficient of expansion than the filming metal, encircling the tube inside of the filming metal to protect the tube from breakage by the compression of the filming member, and a lead in the tube, in electrical connection with the filming member.

4. In an electrolytic apparatus, a device comprising an insulating tube, a member of filming metal on an end of the tube and hermetically sealed to the sides of the tube by compressive contact, a metal member of lower coefficient of expansion than the filming metal, encircling the tube inside the filming body and acting to protect the tube against excessive compression stresses exerted by the filming member, and a lead in the tube, in electrical connection with the filming member.

5. In electrolytic apparatus, an insulating tube carrying in compressive contact with its walls a casting of filming metal, and within the casting a compression-resisting member to protect the tube from excessive compression by said casting.

6. A terminal comprising an insulating tube carrying a metal compressive member, and within said member a protecting member to resist compression stress exerted by the first-mentioned member, said protecting member being substantially free from compressive engagement with the insulating tube.

7. An electrical terminal comprising in combination, an insulating member, a conductive member into which said insulating member extends in contact with said conductive member, and thermal-responsive means within said conductive member for opposing and reducing the force of compression of said conductive member upon said insulating member.

8. In an electrolytic apparatus, a device comprising an insulating tube, a member of filming metal surrounding an end of the tube in compressive engagement with the sides thereof, a member of lower coefficient of expansion than the filming member, disposed within the filming member and below the end of the tube in said filming member and adjacent the portion of the filming member which compressively engages the tube, to protect the tube from breakage by the compression of the filming member, and a lead in the tube, in electrical connection with the filming member.

9. In an electrolytic apparatus, a device comprising an insulating tube, a member of filming metal surrounding an end of the tube in compressive engagement with the sides thereof, a cap of metal having a lower coefficient of expansion than the filming metal, disposed within the filming metal and extending therein across the end of the tube and along the adjacent portion of the sides of the tube, to protect the tube from breakage by the compression of the filming member, and a lead in the tube, in electrical connection with the filming member.

RALPH D. MERSHON.